US012078419B2

(12) United States Patent
Ferguson et al.

(10) Patent No.: US 12,078,419 B2
(45) **Date of Patent: *Sep. 3, 2024**

(54) DYNAMIC COOLING OF A METALLURGICAL FURNACE

(71) Applicant: Systems Spray-Cooled, Inc., Smyrna, TN (US)

(72) Inventors: Scott A. Ferguson, Murfreesboro, TN (US); Troy D. Ward, Franklin, TN (US); Logan A. Wilson, Smyrna, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,180

(22) Filed: May 25, 2023

(65) Prior Publication Data

US 2023/0296320 A1 Sep. 21, 2023

Related U.S. Application Data

(60) Continuation of application No. 17/517,390, filed on Nov. 2, 2021, now Pat. No. 11,692,774, which is a (Continued)

(51) Int. Cl.
*F27B 3/24* (2006.01)
*F27D 1/12* (2006.01)
*F27D 9/00* (2006.01)

(52) U.S. Cl.
CPC .................. *F27B 3/24* (2013.01); *F27D 1/12* (2013.01); *F27D 9/00* (2013.01); *F27D 2009/0016* (2013.01)

(58) Field of Classification Search
CPC ...... F27B 3/24; F27D 1/12; F27D 2009/0016; F27D 2009/0018; F27D 9/00; C21B 7/10
(Continued)

(56) References Cited

U.S. PATENT DOCUMENTS 3,743,752 A 7/1973 Furuhashi
4,789,991 A 12/1988 Metelmann et al.
(Continued)

FOREIGN PATENT DOCUMENTS

CN 204881223 U 12/2015
KR 101818511 81 1/2018
(Continued)

OTHER PUBLICATIONS

PCT Notification of Transmittal of the International Search Report and the Written Opinion of the International Searching Authority for International Application No. PCT/US2019/054943; dated Apr. 17, 2020; 12 total pages.
(Continued)

*Primary Examiner* — Jessee R Roe
*Assistant Examiner* — Michael Aboagye
(74) *Attorney, Agent, or Firm* — Patterson + Sheridan, LLP

(57) ABSTRACT

One embodiment is a cooling system for regulating temperature of a surface of a metallurgical furnace. The cooling system includes a plurality of spray conduits. Each spray conduit has one or more control valves and has a plurality of nozzles. A plurality of temperature sensors are disposed proximate the surface of the metallurgical furnace. A control system adjusts the control valves of the plurality of spray conduits in response to temperature information derived from the plurality of temperature sensors.

17 Claims, 5 Drawing Sheets

Related U.S. Application Data division of application No. 16/154,345, filed on Oct. 8, 2018, now Pat. No. 11,175,094.

(58) Field of Classification Search
USPC .......... 266/44, 46, 241, 83, 88, 99; 432/233; 373/73, 74, 75, 76, 113, 165
See application file for complete search history.

(56) References Cited

U.S. PATENT DOCUMENTS

| | | | | |
|---|---|---|---|---|
| 4,813,055 | A | 3/1989 | Heggart et al. | |
| 4,815,096 | A | 3/1989 | Burwell | |
| 5,115,184 | A | 5/1992 | Arthur et al. | |
| 5,230,617 | A * | 7/1993 | Klein | F27D 9/00 432/116 |
| 5,290,016 | A | 3/1994 | Elsner | |
| 5,561,685 | A | 10/1996 | Lehr et al. | |
| 5,601,427 | A | 2/1997 | Yuasa et al. | |
| 5,653,936 | A | 8/1997 | Enkner et al. | |
| 5,797,274 | A | 8/1998 | Jackaman et al. | |
| 7,452,499 | B2 * | 11/2008 | Arthur | F27D 9/00 373/76 |
| 10,598,436 | B2 | 3/2020 | Ferguson et al. | |
| 2015/0084246 | A1 * | 3/2015 | Tang | F27B 3/24 266/46 |
| 2017/0097191 | A1 | 4/2017 | Kullertz et al. | |

FOREIGN PATENT DOCUMENTS

| | | | |
|---|---|---|---|
| TW | 201305520 | A | 2/2013 |
| WO | 2018195223 | A1 | 10/2018 |

OTHER PUBLICATIONS

International Preliminary Report on Patentability from PCT/US2019/054943 dated Apr. 22, 2021.

Extended European Search Report and Rule 70 EPC Communication for EP 19871817.3 dated Jul. 14, 2022.

Office Action from Taiwan Patent Application No. 108136369 dated Mar. 13, 2023.

Office Action from Taiwan Patent Application No. 108136369 dated Jan. 4, 2024.

Office Action from Mexican Patent Application No. MX/a/2021/003894 dated Jun. 21, 2024, with statement of relevance.

* cited by examiner 44P
44
72
12
20
40
42
70
31
Z
16M
16
14
30
33
22
24
15
35
10
37
39
38

DYNAMIC COOLING OF A METALLURGICAL FURNACE

RELATED APPLICATIONS

This application is a continuation of U.S. patent application Ser. No. 17/517,390, filed Nov. 2, 2021, now U.S. Pat. No. 11,692,774, which is a divisional of U.S. patent application Ser. No. 16/154,345, filed Oct. 8, 2018, now U.S. Pat. No. 11,175,094, the contents of which are incorporated herein by reference in their entities.

BACKGROUND OF THE DISCLOSURE

Field of the Disclosure

Embodiments of the present disclosure relates generally to a cooling system for metallurgical furnaces used in the processing of molten materials. More specifically, the present disclosure relates to a cooling system of a surface (e.g., a sidewall, a roof, and the like) of a metallurgical furnace.

Description of the Related Art

Metallurgical furnaces (e.g., an electric arc furnace or a ladle metallurgical furnace) are used in the processing of molten materials. The furnaces house molten materials at least during the heating step of the processing. Metallurgical furnaces process such molten materials as steel, which also generates slag as a byproduct of processing.

A metallurgical furnace has a number of components, including a roof that is retractable, a hearth that is lined with refractory brick, and a sidewall that sits on top of the hearth. Some metallurgical furnaces rest on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of, for example, the roof and sidewall of the furnace. One type of cooling method circulates a pressurized fluid-based coolant (e.g., water) through tubular pipes that form panels. The panels are then used to cool the sidewall and/or roof of the furnace, such that the tubular pipes and the coolant circulated through the panels regulates the temperature of the metallurgical furnace during the processing of molten materials. Since the coolant is pressurized within the pipes, damage to the pipe may allow a significant amount of coolant to contact the molten material within the furnace. In the event that the coolant is covered by molten materials, for example during the tilting operations, the coolant may vaporize and create an explosion hazard.

Accordingly, an alternative type of cooling method has been developed to reduce the likelihood of an explosion from the inadvertent vaporization of coolant. The alternative type of cooling method, referred to as low pressure or non-pressurized spray-cooling, sprays a fluid-based coolant (e.g., water) against an external surface of a plate. The plate may be a part of a sidewall, a roof, or ductwork of the furnace. For this cooling method, the fluid-based coolant is sprayed from a nozzle at a low pressure. In some instances, the fluid-based coolant may be non-pressurized such that it is sprayed from the nozzle at atmospheric pressure. As the fluid-based coolant contacts the external surface of the plate, the coolant dissipates the heat generated within the plate as a result of the processing of molten materials, thus regulating the temperature of the plate.

The amount of coolant delivered to the furnace is typically selected to maintain the hottest portion of the furnace below a desired temperature. Since cooler portions of the furnace do not require as much coolant as compared to the hottest portion, the total amount of coolant utilized is often well in excess of the actual amount needed. Additionally, the temperature of different portions of the furnace often fluctuates over time, for example when the furnace is tilted. Thus, the amount of coolant needed to maintain desired temperatures often varies over time. Since the amount of coolant is set to meet the maximum heat load, a significant amount of coolant is wasted during times when the furnace is experiencing a low heat load. The wasted coolant considerably increases the cost to operate the furnace.

There is a need for an improved cooling system that helps regulate the temperature of metallurgical furnaces.

SUMMARY

One embodiment is a cooling system for regulating temperature of a surface of a metallurgical furnace. The cooling system includes a plurality of spray conduits. Each spray conduit has one or more control valves and has a plurality of nozzles. A plurality of temperature sensors are disposed proximate the surface of the metallurgical furnace. A control system adjusts the control valves of the plurality of spray conduits in response to temperature information derived from the plurality of temperature sensors.

Another embodiment is a method of cooling a surface of a metallurgical furnace. The method includes providing a spray cooling to a plurality of zones defined on a surface of the metallurgical furnace. A change in a temperature of a first zone of the plurality of zones defined on the surface of the metallurgical furnace is sensed. An amount of spray cooling provided to the first zone relative to a second zone of the plurality of zones is changed based on the sensed changed in temperature.

Yet another embodiment is a cooling system for regulating temperature of a surface of a metallurgical furnace. The cooling system includes a plurality of spray conduits arranged around a plurality of zones of the surface of the metallurgical furnace. Each spray conduit has one or more control valves to control an amount of coolant to a plurality of nozzles. A control system is coupled to the one or more control valves of each spray conduit to independently change the flow of coolant to one or more of the spray conduits of a first zone relative to one or more of the spray conduits to a second zone.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Certain embodiments are directed to a cooling system for a metallurgical furnace including sensors and independently controllable nozzles. The sensors are for monitoring a temperature of one or more areas (e.g., zones) of a surface, such as a roof, a sidewall, and/or ductwork, of the metallurgical furnace. The nozzles are independently controllable in that an amount of coolant provided by one nozzle to one zone can be controlled independently relative to an amount of coolant provided by another nozzle to another zone. Different areas of the metallurgical furnace may have different heat loads. In certain embodiments, the temperature of the different areas is sensed and coolant flows are locally and independently adjusted to these different areas in response to the sensed temperature. If an area is overheating, the flow of coolant may be increased to maintain the temperature of the surface below a predefined high temperature limit. The flow may be increased by increasing the flow through one or more nozzles, and/or add to the number of nozzles providing flow to the area. If an area has a temperature lower than a predefined low temperature limit, the flow of coolant may be decreased to conserve coolant and to conserve energy from evacuating the spent coolant, such as conserving water (which drives the pumps) and energy from pumping the spent coolant. The flow may be decreased by decreasing the flow through one or more nozzles, and/or turning off one or more of nozzles providing flow to the area. In one example, the flow may be decreased in one or more areas while the flow is increased in one or more different areas.

Figure 1:
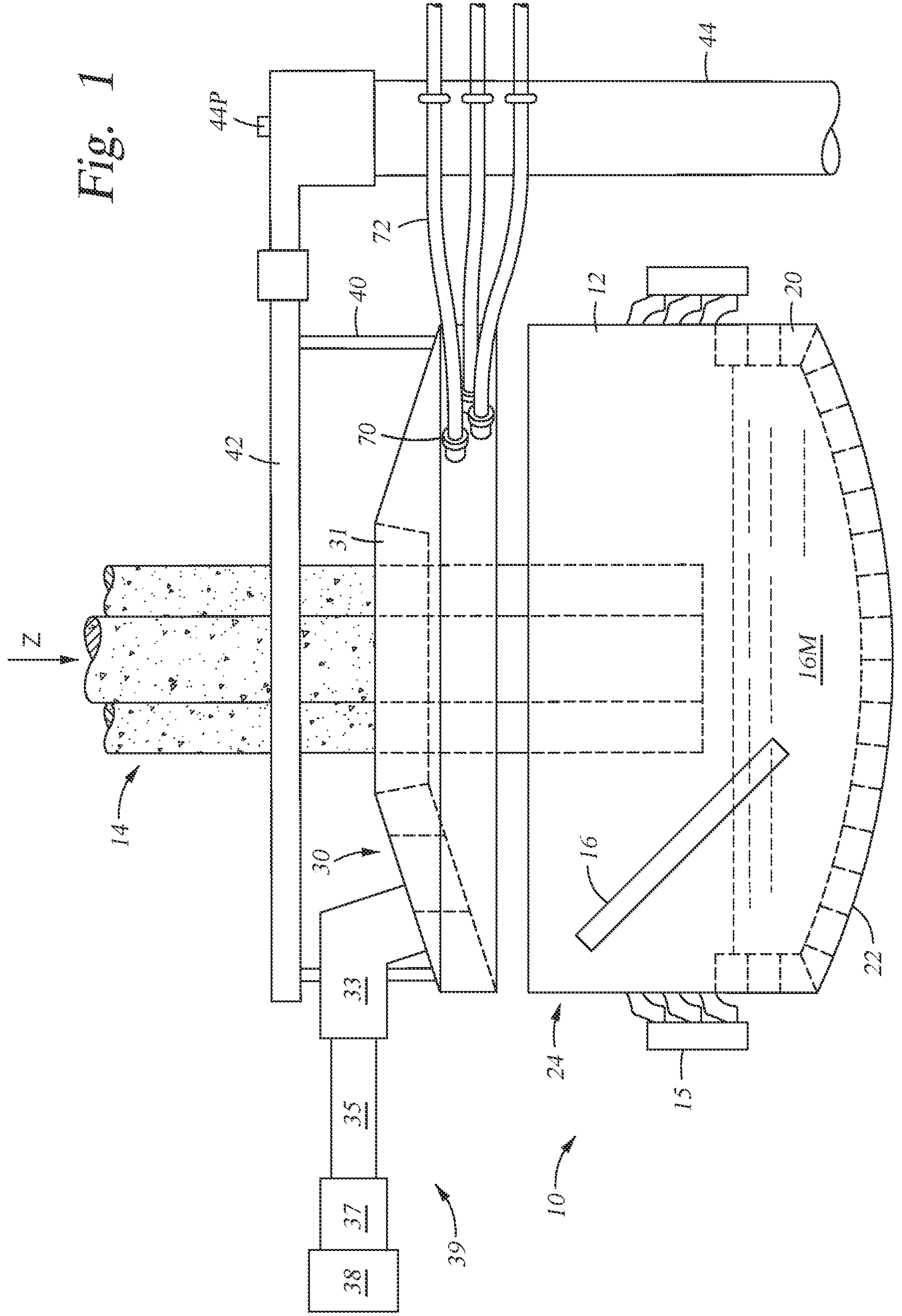
FIG. 1 is schematic diagram of a partial cross-sectional side view of certain embodiments of a metallurgical furnace having various components.

FIG. 1 is schematic diagram of a partial cross-sectional side view of certain embodiments of a metallurgical furnace 10 having various components, including a hearth 20 that is lined with refractory brick 22, and a sidewall 24 disposed over the perimeter of the hearth 20. The hearth 20 and the sidewall 24 define an interior portion 12 of the metallurgical furnace 10. The interior portion 12 may be loaded or charged with material 16, e.g., metal, scrap metal, or other meltable material, which is to be melted within the metallurgical furnace 10 to form molten material 16M. The material 16 may reside non-uniformly in the interior portion 12 of the metallurgical furnace 10 causing different heat loads within the interior portion 12 of the metallurgical furnace 10. For example, a greater amount of the material 16 of scrap metal may preferentially reside against one area of the sidewall 24 relative to another area of the sidewall 24.

The metallurgical furnace 10 includes a roof 30 which may be moved from the sidewall 24 to expose the interior portion 12 of the furnace 10 through a top of the sidewall 24. For example, swinging the roof 30 horizontally enables the metallurgical furnace 10 to be loaded or charged with the material 16.

The roof 30 may have a central opening 31. Electrodes 14 may extend through the central opening 31 from a position above the roof 30. During operation of the furnace 10, the electrodes 14 are lowered through the central opening 31 into the interior portion 12 of the metallurgical furnace 10 to provide electric arc-generated heat to melt the material 16. Burners 15, such as fuel feed burners, may be mounted around the furnace, such as mount around the sidewalls 24 to provide additional heating to cold-spots around the furnace 10. Melted or molten material 16M collects in the hearth 20.

The roof 30 may include a roof elbow 33. The roof elbow 33 is fluidly coupled to an interior portion of the metallurgical furnace. The roof elbow 33 directs hot waste gas and air from the interior portion 12 of the metallurgical furnace 10. The roof elbow 33 fluidly coupled to a dropout chamber 38 through a duct 35. The hot waste gas from the metallurgical furnace 10 is directed by the roof elbow 33 through the duct 35 to the dropout chamber 38 for collection of waste duct and particles from the waste gas. An expansion box 37 may be fluidly coupled along the length of the duct 35 to allow thermal expansion of the duct 35 due to the hot gas from the metallurgical furnace 10. The roof elbow 33, the duct 35, the expansion box 37, the dropout chamber 38, and other ducts are collectively referred to as ductwork 39.

The roof 30 may be attached by chains, cables, or other roof lift members 40 to mast arms 42 that extend horizontally and spread outward from a mast post 44. The mast arms 42 may be able to pivot around a point 44P of the mast post 44 to swing the roof 30 horizontally to the side away from the sidewall 24. The roof 30 may be circular in shape when viewed from a top view.

Figure 2:
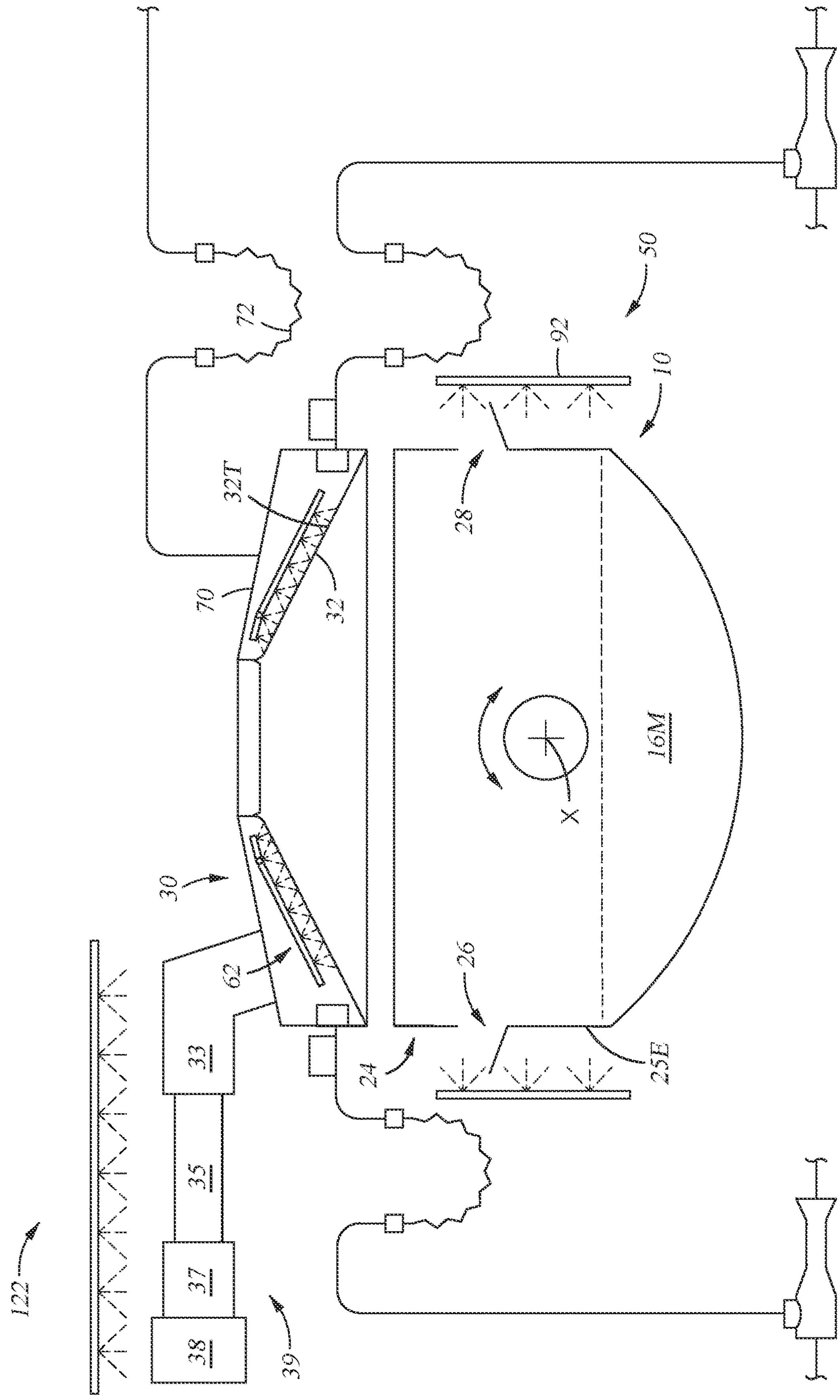
FIG. 2 is schematic diagram of a cross-sectional side view of certain embodiments of a metallurgical furnace that may be tilted about an axis.

FIG. 2 is schematic diagram of a cross-sectional side view of certain embodiments of a metallurgical furnace 10 that may be tilted about an axis X. For example, the metallurgical furnace 10 may be tilted one or more times during a single batch melting process toward a slag door 26 in the sidewall 24 to remove slag. The metallurgical furnace 10 may be tilted about its X axis towards a tap spout 28 one or more times during a single batch melting process to remove the molten material 16M. When the metallurgical furnace 10 tilts, the amount of heat transferring to the surfaces of the metallurgical furnace 10 changes, with some areas becoming hotter and other areas becoming cooler. The change in temperature may be due to the increase volume of molten materials 16M disposed in one area of the metallurgical furnace 10, and/or a change in the amount of coolant provided to the surfaces of the metallurgical furnace 10.

The furnace 10 includes a spray cooling system 50 which sprays a fluid based coolant, such as water or some other suitable liquid, to a surface of the furnace to reduce excess heat buildup of the furnace. The spray cooling system 50 may include a sidewall cooling portion 92 to reduce excess heat buildup of the sidewall 24. The sidewall cooling portion 92 sprays a fluid based coolant to an exterior surface 25E of an inner plate 25 the sidewall 24. The spray cooling system 50 may include a roof cooling portion 62 to reduce excess heat buildup of the roof 30. The roof cooling portion 62 sprays a fluid based coolant to a top surface 32T of an inner plate 32 of the roof 30. The spray cooling system 50 may include a duct cooling portion 122 to reduce excess heat buildup of the roof elbow 33, the duct 35, the expansion box 37, the dropout chamber 38, or other ducts of the metallurgical furnace 10.

Figure 3:
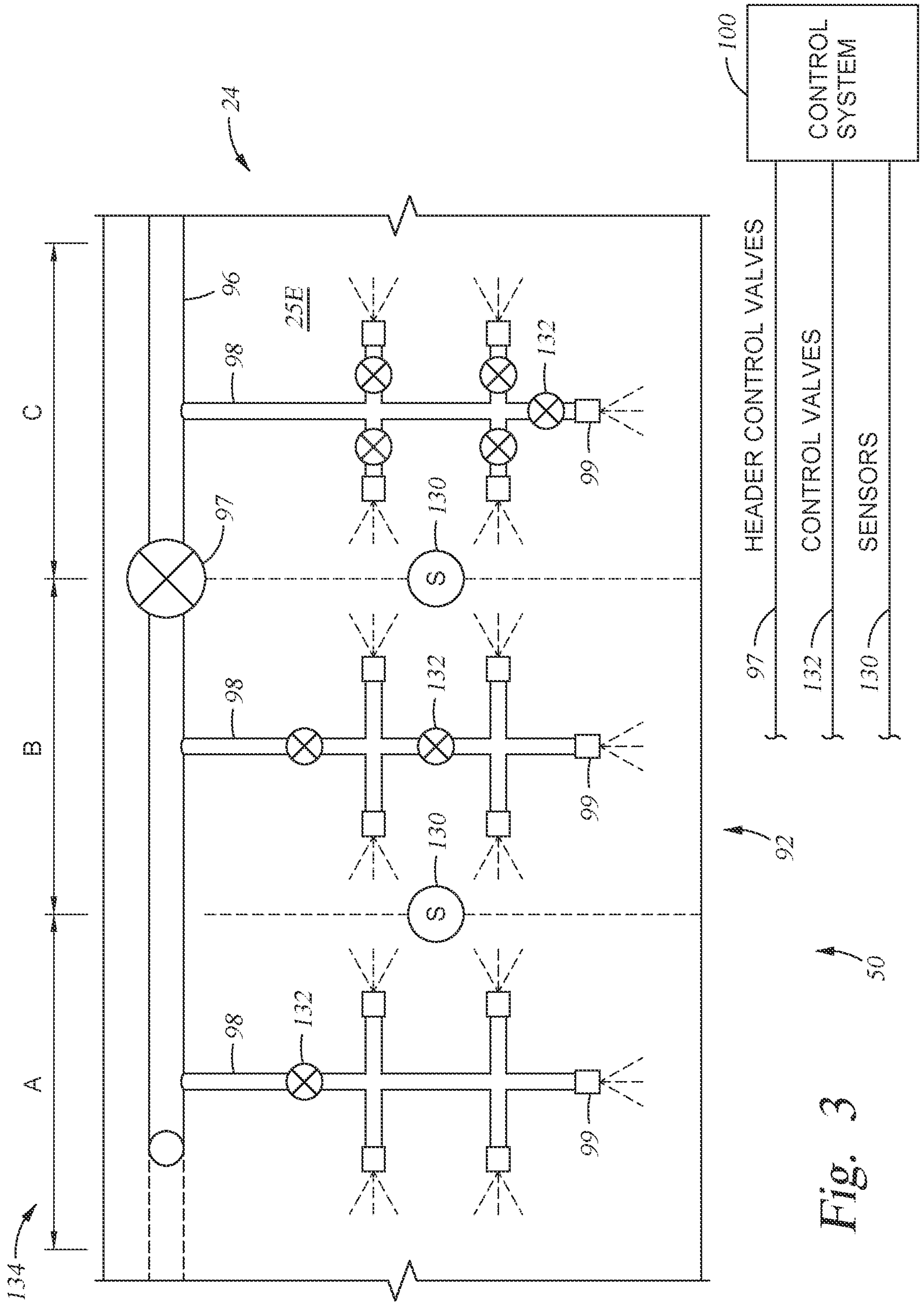
FIG. 3 is a schematic diagram of certain embodiment of a sidewall cooling portion of a spray cooling system of a metallurgical furnace.

FIG. 3 is a schematic diagram of certain embodiment of a sidewall cooling portion 92 of the spray cooling system 50 of the metallurgical furnace 10. The sidewall cooling portion 92 of the spray cooling system 50 reduces excess heat buildup of the sidewall 24 from melting of material 16 within the furnace 10 of FIG. 1 or FIG. 2. FIG. 3 may also represent a top view or a side view of a duct cooling portion 122 of the spray cooling system 50 to an exterior surface of a hot inner plate of the roof elbow 33, the duct 35, the expansion box 37, the dropout chamber 38, or other ducts from hot gas from the melting of material 16 within the furnace 10 of FIG. 1 or FIG. 2.

The sidewall cooling portion 92 may include a header 96 and a plurality of spray conduits 98 fluidly connected to the header 96. The header 96 is fluidly connected to a supply pipe that supplies fluid based coolant to the spray cooling system. The header 96 may form a circular shape or another appropriate shape. The sidewall cooling portion 92 could include more than one supply pipe and more than one header 96.

The spray conduits 98 may branch from the header 96 in a vertical pattern or another pattern. As shown in FIG. 3, the spray conduits 98 branch vertically downwards from the header 96. Each spray conduit 98 includes one or more nozzles 99 configured to disperse coolant in a spray or fine droplet pattern towards an exterior surface 25E of an inner plate 25 the sidewall 24. The one or more nozzles 99 may be angled to spray coolant against the exterior surface 25E of the inner plate 25 the sidewall 24. The spray conduits 98 may be arranged in a manner such that coolant is sprayed across substantially the entirety of the surface of the exterior surface 25E of the inner plate 25 of the sidewall 24. The nozzles 99 are utilized to control the temperature of the inner plate 25 of the sidewall 24.

The spray conduits 98 may be arranged proximate a plurality of zones 134 (zone A, zone B, zone C, etc.) of the exterior surface 25E of the inner plate 25 of the sidewall 24 such that each zone 134 is associated with one or more spray conduits 98. The zones 134 may be overlapping and/or non-overlapping areas of the sidewall 24.

Each zone 134 may include one or more control valves 132 controlling the flow of cooling fluid for the spray conduits 98 for the zone 134. For example, a control valve 132 may be disposed between the header 96 and the spray conduit 98 to control the entire flow of coolant to the spray conduit 98 as shown in zone A. In another example, a control valve 132 may be disposed between the header 96 and the spray conduit 98 and a second control valve may be disposed in the middle of the spray conduit so that the control of coolant may be independently controlled for the top portion of the spray conduit 98 and the bottom portion of the spray conduit 98 as shown in zone B. In another example, a control valve 132 may be disposed before each nozzle 99 to independently control the flow of coolant from each nozzle as shown in zone C. All of the zones 134 may have control valves 132 arranged similarly on a spray conduit 98 (i.e., all like as shown in zone A, all like as shown in zone B, all like as some in zone C, or all like in another suitable arrangement) or the control valves 132 on the spray conduits 98 may be arranged differently in two or more arrangements (i.e., arranged as a combination of the arrangement as shown in zone A, zone B, zone C, or another suitable arrangement).

The one or more control valves 132 may control, such as adjusting, turning on, turning off, increasing, and/or decreasing, flow of the coolant to the sidewall 24 exiting the nozzles 99 from the spray conduits 98. The control valves 132 are electrically coupled (wired or wireless connection) to a control system 100.

The header 96 may include one or more header control valves 97. For example, the header control valve 97 between zone B and zone C can reduce or choke the flow of coolant between zone B and zone C. For example, if a supply pipe supplies coolant from zone C to zone B, the header control valve 97 may choke or limit the flow of coolant to zones A and B. If the supply pipe supplies coolant from zone B to zone C, the header control valve 97 may choke or limit the flow of coolant to zone C. The header control valves 97 are electrically coupled (wired or wireless connection) to a control system 100.

The sidewall cooling portion 92 may include one or more temperature sensors 130, such as thermocouple sensors or infrared sensors, to measure the temperature of the inner plate 25 of the sidewall 24. In certain embodiments, the temperature sensors 130 are disposed on, in, and/or over the inner plate 25 of the sidewall 24. For example, the temperature sensor 130 may be directly measuring the temperature of the inner plate 25 of the sidewall 24 or may be indirectly measuring the temperature of the inner plate 25 of the sidewall 24 by measuring the temperature of spent coolant run-off from the inner plate 25 of the sidewall 24. Each temperature sensor 130 may be associated with one or more zones 134 of the sidewall 24. Each zone 134 may be associated with one or more temperature sensors 130. For example, one temperature sensor may be associated with an upper half of zone 134 and another temperature sensor may be associated with a lower half of zone 134, such as an upper half and a lower half of zone A.

The temperature sensors 130 are communicatively coupled (wired or wireless connection) to the control system 100. The control system 100 monitors the measured temperatures of the temperature sensors 130. The control system 100 can determine from measured temperatures of the temperature sensors 130 if the inner plate 25 of the sidewall 24 is outside a normal operating range. In other embodiments, a thermal imaging camera may be used instead of the temperature sensors 130 or in combination with the temperature sensors to determine the temperature of the inner plate 25 of the sidewall 24.

The control system 100 can individually control or set the flow of the spray conduits 98 of a particular zone 134 of the sidewall 24 or can individually control or set the flow of one nozzle 99 relative to another nozzle 99 of the same or different spray conduits 98. For example, the control system 100 can set the header control valves 97 and/or the control valves 132 of spray conduits 98 to an open state from a closed state or to a higher flow state from a lower flow state to increase the amount of coolant flow through the spray conduits 98 and exiting the nozzles 99 when the measured temperature of the temperature sensor(s) associated with the particular zone is above an upper temperature threshold to provide increased cooling to the particular zone. If a particular zone 134 is overheating, the flow of coolant may be increased or set to a high flow to maintain the hot face (e.g., inner plate 25 of the sidewall 24) within a desired temperature range. In another example, the control system 100 can control or set the header control valves 97 and/or the control valves 132 of spray conduits 98 to a closed state from an open state or to a lower flow state from a higher flow state to reduce the flow of coolant when the measured temperature of the temperature sensor(s) associated with the particular zone is below a lower temperature threshold to provide reduce cooling to the particular zone. In yet another example, the state of one or more header control valve 97 and/or one or more control valves 132 may be changed in response to a sensed change in temperature of one of the zones to adjust the amount of coolant provided to the zone associated with the temperature change independent of any flow change to other zones. If a particular zone 134 has a lower temperature than a normal operating range, the flow of coolant may be decreased to conserve coolant sprayed and to conserve energy from evacuating the spent coolant to the particular zone.

Spray cooling of the metallurgical furnace can be provided to a plurality of zones 134 defined on the surface of the sidewall 24. A changed in a temperature of a first zone of the plurality of zones 134 can be sensed. The amount of spray cooling provided to the first zone 134 (such as zone A) can be changed relative to a second zone (such as zone B) of the plurality of zones 134 based on the sensed changed in temperature of the first zone 134. The amount of spray cooling can be changed by changing the flow of coolant for one nozzle 99 relative to another nozzle 99 on the same spray conduit 98 or on different spray conduits 98. When an increased in temperature of the first zone 134 is sensed, the flow of coolant may be increased relative to the second zone 134. When a decrease in temperature of the first zone 134 is sensed, the flow of coolant may be decreased relative to the second zone 134. The temperature of each zone 134 may be sensed to independently control the cooling to each zone of the sidewall 24. A zone 134 may further be sub-divided in to sub-zones, such as an upper half and a lower half, to further provide independent flow of coolant to the sub-zones.

Figure 4:
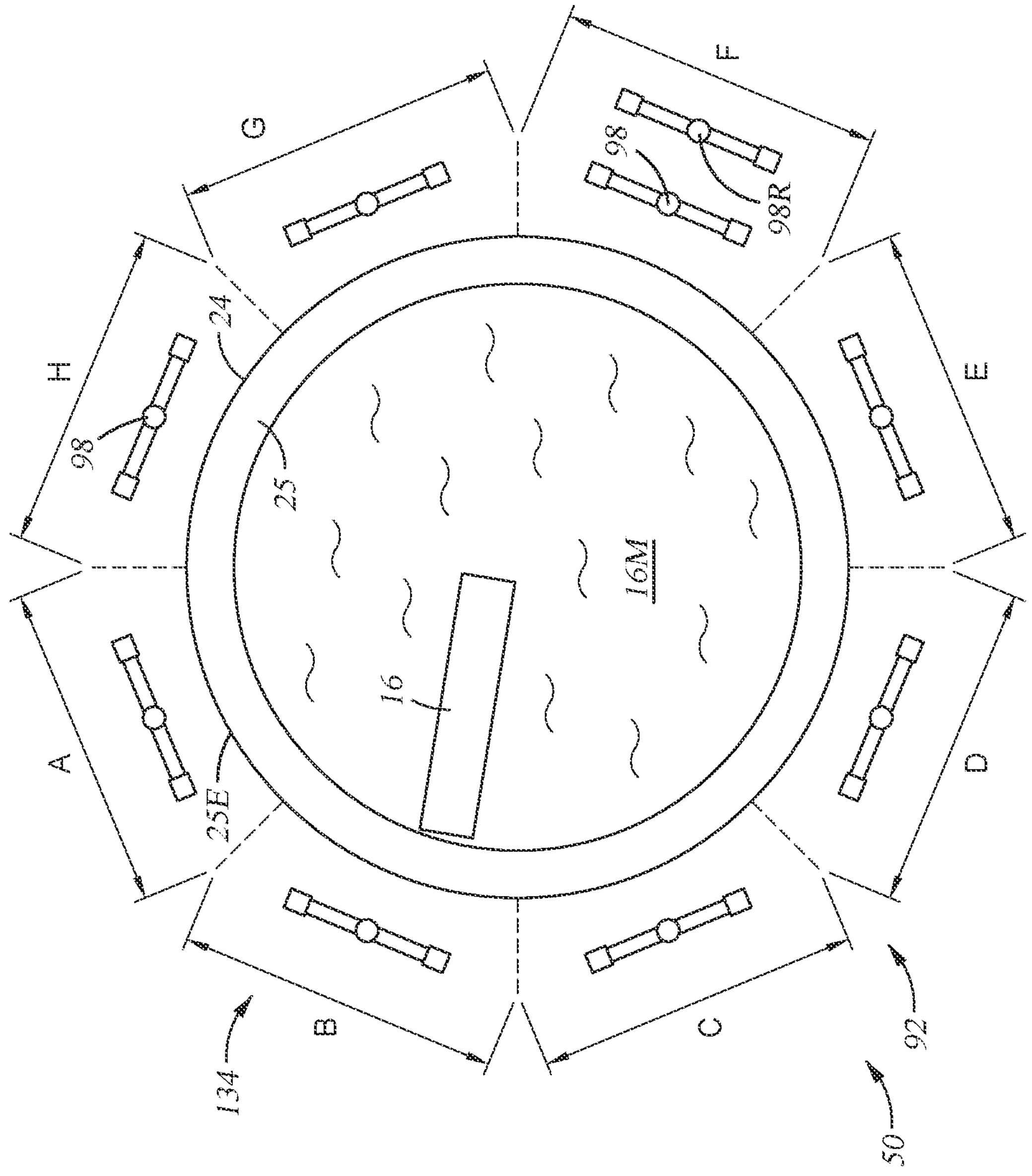
FIG. 4 is a schematic diagram of certain embodiments of a top view of a sidewall cooling portion of a spray cooling system of the metallurgical furnace of FIG. 3.

FIG. 4 is a schematic diagram of certain embodiments of a top view of the sidewall cooling portion 92 of the spray cooling system 50 of the metallurgical furnace 10 of FIG. 3. The spray conduits 98 of the sidewall cooling portion 92 are arranged proximate a plurality of zones 134 (zone A, zone B, zone C, etc.) of the exterior surface 25E of the inner plate 25 of the sidewall 24 such that each zone 134 is associated with one or more spray conduits 98. The metallurgical furnace 10 may be loaded or charged with material 16 to be melted to form molten material 16M. The material may reside non-uniformly proximate one or more zone 134 causing a greater heat load to certain areas of the sidewall 24. As shown in FIG. 4, the material resides non-uniformly adjacent zone B of the plurality of zones 134. The control valves to the spray conduits 98 of zone B may be controlled to maximize or to increase the flow of cooling fluid to the sidewall 24 of zone B to provide maximum or increased flow of cooling fluid for additional cooling of the sidewall 24 due to the greater heat load of zone B. Other zones 134, such as zone G or zone F, may be experiencing a decreased heat load. The control valves to the spray conduits 98 may be controlled to provide minimum or decreased flow of cooling fluid to reduce cooling of the sidewall 24 due to the lower heat load of zone G or zone F.

In certain embodiments, when the furnace 10 is tipped, such as to tipping to the slag door 26 or tipping to the tap spout 28, towards one or more zones 134 of the inner plate 25 of the sidewall 24, the one zones 134 may become hotter than another zone 134 due to coolant redistribution on the inner plate 25 of the sidewall 24 or shifting of the molten material 16M within the furnace 10. Thus, one or more zones 134 may experience an increase in temperature while one or more other zones 134 may experience a decrease in temperature. The control valves 132 change the flow to the nozzles 99 of the spray conduits 98 of each zone 134 independently of another zone 134. Therefore, one of the zones 134 may be set to a high flow of cooling fluid and another one of the zones 134 may be set to a low flow of cooling fluid. Furthermore, still another one of the zones 134 may remain unchanged, such as if the sensed temperature from the temperature sensor 130 for the zone is within a desired ranged. The flow of coolant to one zone is independent of the flows to the other zones increasing, decreasing or staying the same.

In certain embodiments, the spray cooling system 50 may have a redundant spray conduit overlapping with another spray conduit to provide coolant to a surface of a metallurgical furnace. For example, a redundant spray conduit 98R is disposed in zone F of the sidewall cooling portion 92. For example, the redundant spray conduit 98R may have a spray coverage area that covers zone F, a portion of zone F, or more than zone F and that is redundant or overlapping with one or more spray conduits 98. One or more of the other zones may also include a redundant spray conduit 98R. The redundant spray conduit 98R may be configured as any of the spray conduits 98 described above. The redundant spray conduit 98R may be configured the same as or differently from the spray conduit 98 sharing the same zone.

Figure 5:
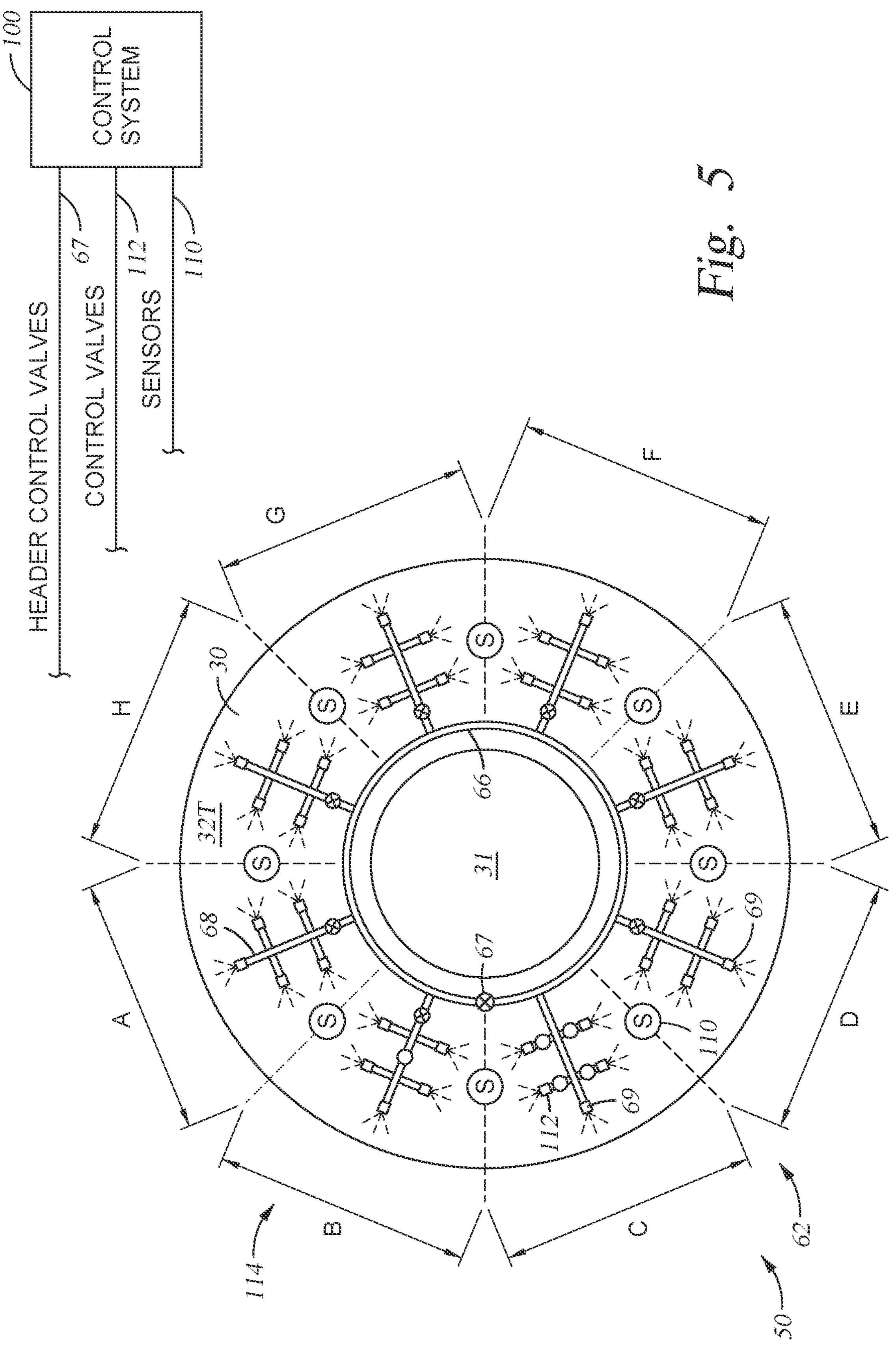
FIG. 5 is a schematic diagram of certain embodiments of a top view of a roof cooling portion of a spray cooling system of a metallurgical furnace.

FIG. 5 is a schematic diagram of certain embodiments of a top view of a roof cooling portion 62 of the spray cooling system 50 of the metallurgical furnace 10. The roof cooling portion 62 of the spray cooling system 50 reduces excess heat buildup in the roof 30 from melting of material 16 within the furnace 10 of FIG. 1 or FIG. 2.

The roof cooling portion 62 may include a header 66 and a plurality of spray conduits 68 fluidly connected to the header 66. The header 66 is fluidly connected to a supply pipe, such as the supply pipe 70 of FIG. 1 or FIG. 2. The supply pipe 70 may be fluidly connected to a flexible supply hose 72 that supplies fluid based coolant to the spray cooling system 50. The header 66 may form a circular pattern or another appropriate pattern. The spray cooling system 50 could include more than one supply pipe 70 and more than one header 66.

The spray conduits 68 may branch radially from the header 66 in a spoke-like pattern or another pattern. For example, some of the spray conduits 68 may branch radially outwards from the header 66 towards the outer edge of the roof 30 and some of the spray conduits (not shown) may branch radially inwards towards the central opening 31 of the roof 30. Each spray conduit 68 includes one or more nozzles 69 configured to disperse coolant in a spray or fine droplet pattern towards a top surface 32T of an inner plate 32 the roof 30. The one or more nozzles 69 may be angled to spray coolant against the top surface 32T of the inner plate 32 the roof 30. The spray conduits 68 may be arranged in a manner such that coolant is sprayed across substantially the entirety of the top surface 32T of an inner plate 32 the roof 30. The nozzles 69 are utilized to control the temperature of the inner plate 32 of the roof 30.

The spray conduits 68 may be arranged proximate a plurality of zones 114 (zone A, zone B, zone C, etc.) of the top surface 32T of the inner plate 32 of the roof 30 such that each zone 114 is associated with one or more spray conduits 68. The zones 114 may be overlapping and/or non-overlapping areas of the roof 30.

Each zone 114 may include one or more control valves 112 controlling the flow of cooling fluid for the spray conduits 68 for the zone 114. For example, a control valve may be disposed between the header 66 and the spray conduit 68 to control the entire flow of coolant to the spray conduit 68 as shown in zone A. In another example, a control valve may be disposed between the header 66 and the spray conduit 68 and a second control valve may be disposed in the middle of the spray conduit so that the control of coolant may be independently controlled for the top portion of the spray conduit 68 and the bottom portion of the spray conduit 68 as shown in zone B. In another example, a control valve may be disposed before each nozzle 69 to independently control the flow of coolant from each nozzle as shown in zone C. All of the zones 114 may have control valves 112 arranged similarly (i.e., all like as shown in zone A, all like as shown in zone B, all like as some in zone C, or all like in another suitable arrangement) or the control valves 112 may be arranged differently in two or more arrangements (i.e., arranged as a combination of the arrangement as shown in zone A, zone B, zone C, or another suitable arrangement).

The one or more control valves 112 may control, such as adjusting, turning on, turning off, increasing, and/or decreasing, flow of the coolant to the roof 30 exiting from nozzles 69 of the spray conduits 68. The control valves 112 are electrically coupled (wired or wireless connection) to a control system 100.

The header 66 may include one or more header control valves 67. For example, the header control valve 67 between zone B and zone C can reduce or choke the flow of coolant between zone B and zone C. For example, if a supply pipe supplies coolant from zone C to zone B, the header control valve 67 may choke or limit the flow of coolant to zones A and B. If the supply pipe supplies coolant from zone B to zone C, the header control valve 67 may choke or limit the flow of coolant to zone C. The header control valves 97 are electrically coupled (wired or wireless connection) to a control system 100.

The spray cooling system 50 of the roof 30 may include one or more temperature sensors 110, such as thermocouple or infrared sensors, to measure the temperature of the inner plate 32 of the roof 30. In certain embodiments, the temperature sensors 110 are disposed on, in, and/or over the inner plate 32 of the roof 30. For example, the temperature sensor 110 may be directly measuring the temperature of the inner plate 32 of the roof 30 or may be indirectly measuring the temperature of the inner plate 32 of the roof 30 by measuring the temperature of spent coolant run-off from the inner plate 32 of the roof 30. Each temperature sensor 110 may be associated with one or more zones 114 of the roof 30. Each zone 114 may be associated with one or more temperature sensors 110. For example, one temperature sensor may be associated with a radial inward half of zone 114 and another temperature sensor may be associated with a radial outward half of zone 114, such as an radial inward half and a radial outward half of zone A.

The temperature sensors 110 are communicatively coupled (wired or wireless connection) to the control system 100. The control system 100 monitors the measured temperatures of the temperature sensors 110. The control system 100 can determine from measured temperatures of the temperature sensors 110 if the inner plate 32 of the roof 30 is outside a normal operating range. In other embodiments, a thermal imaging camera may be used instead of the temperature sensors 110 or in combination with the temperature sensors to determine the temperature of the inner plate 32 of the roof 30.

The control system 100 can individually control or set the flow of the spray conduits 68 of a particular zone 114 of the roof 30 or can individually control or set the flow of one nozzle 69 relative to another nozzle 69 of the same or different spray conduits 68. For example, the control system 100 can set the state of the header control valves 67 and/or the control valves 112 to an open state from a closed state or to a higher flow state from a lower flow state to increase the amount of coolant flow through the spray conduits 68 and exiting the nozzles 69 when the measured temperature of the temperature sensor(s) associated with the particular zone is above an upper temperature threshold to provide increased cooling to the particular zone. If a particular zone 114 is overheating, the flow of coolant may be increased or set to a high flow to maintain the hot face (e.g., inner plate 32 of the roof 30) within a desired temperature range. In another example, the control system 100 can control or set the header control valves 67 and/or the control valves 112 to a closed state from an open state or to a lower flow state from a higher flow state to reduce the flow of coolant when the measured temperature of the temperature sensor(s) associated with the particular zone is below a lower temperature threshold to provide reduce cooling to the particular zone. In yet another example, the state of one or more header control valves 67 and/or control valves 112 may be changed in response to a sensed change in temperature of one of the zones to adjust the amount of coolant provided to the zone associated with the temperature change independent of any flow change to other zones. If a particular zone 114 has a lower temperature than a normal operating range, the flow of coolant may be decreased to conserve coolant sprayed and to conserve energy from evacuating the spent coolant to the particular zone.

Spray cooling of the metallurgical furnace can be provided to a plurality of zones 114 defined on the surface of the roof 30. A changed in a temperature of a first zone of the plurality of zones 114 can be sensed. The amount of spray cooling provided to the first zone 114 (such as zone A) can be changed relative to a second zone (such as zone B) of the plurality of zones 114 based on the sensed changed in temperature of the first zone 134. The amount of spray cooling can be changed by changing the flow of coolant for one nozzle 69 relative to another nozzle 69 on the same spray conduit 68 or on different spray conduits 68. When an increased in temperature of the first zone 114 is sensed, the flow of coolant may be increased relative to the second zone 114. When a decrease in temperature of the first zone 114 is sensed, the flow of coolant may be decreased relative to the second zone 114. The temperature of each zone 114 may be sensed to independently control the cooling to each zone of the roof 30. A zone 114 may further be sub-divided in to sub-zones, such as a radial inward half and a radial outward half, to further provide independent flow of coolant to the sub-zones.

In certain embodiments, when a burner 15 of FIG. 1 is on and the material 16 within the furnace deflects heat in a manner that makes one zone 134 of the sidewall or one zone 114 of the roof 30 increase in temperature, that particular zone receives a greater flow of coolant compared to the other zones. Once the heat load is removed and the sensors, such as sensor 110, 130, detect the zone becoming cooler, the amount of coolant to that particular zone may be reduced or even returned to its normal setting independent of the flows to the other zones increasing, decreasing or staying the same.

Certain embodiments are directed to a cooling system for a metallurgical furnace including monitoring a temperature of one or more areas or zones of a surface, such as a sidewall and/or roof, of the metallurgical furnace. Monitoring of the temperature may be conducted by temperature sensors and/or thermal imaging. Certain embodiments are directed to a cooling system for a metallurgical furnace including monitoring a temperature of one or more areas or zones of the roof and/or the sidewall. Different areas of the metallurgical furnace may have different heat loads. In certain embodiments, the temperature of the different areas or zones is monitored and the coolant flow is adjusted to these different zones in response to changes in the monitored temperature. If a zone is increasing in temperature or overheating (i.e., beyond a predetermined temperature threshold), the flow of coolant may be increased or set to a high flow to maintain the hot face (e.g., inner plate of the sidewall and/or roof) within a desired temperature range. If a zone is experiencing a decrease in temperature or a temperature less than a normal operating range, the flow of coolant to the zone may be decreased or shut off to conserve coolant and to conserve energy from evacuating the spent coolant, such as conserving energy utilized to pump the spent coolant.

While the foregoing is directed to embodiments of the present disclosure, other and further embodiments may be devised without departing from the basic scope thereof, and the scope thereof is determined by the claims that follow.

What is claimed is:

1. A method of cooling a surface of a metallurgical furnace, comprising:

controlling an amount of coolant flowing through a control header valve connected to a spray cool supply header disposed in a wall or a roof of the metallurgical furnace;

spraying, from a plurality of spray nozzles of a plurality of spray conduits connected to and extending from the spray cool supply header, the coolant onto a surface a plurality of zones defined across the surface of the metallurgical furnace, each spray conduit having one or more control conduit valves operable to control an amount of coolant flowing to the plurality of spray nozzles;

sensing, via a plurality of sensors, a change in temperature of a first zone of the plurality of zones defined on the surface of the metallurgical furnace; and changing, by operation of a control system coupled to the plurality of sensors, the control header valve, and the one or more control conduit valves, the amount of coolant flowing through the control header valve, and the one or more control conduit valves to the surface within the first zone relative to a second zone of the plurality of zones based on the sensed change in temperature.

2. The method of claim 1, wherein the amount of spray cooling provided to the first zone relative to the second zone is changed by changing a flow of one nozzle of the plurality of spray nozzles relative to a second nozzle of the plurality of spray nozzles.

3. The method of claim 2, wherein the one nozzle and the second nozzle are on a same spray conduit.

4. The method of claim 2, wherein the one nozzle and the second nozzle are on different spray conduits.

5. The method of claim 2, wherein the flow of the one nozzle relative to the second nozzle is increased due to a sensed increase in the temperature.

6. The method of claim 2, wherein changing the amount of the coolant flowing comprises:

adjusting the one or more control conduit valve to turn on, turn off, increase, and/or decrease the flow of the coolant.

7. The method of claim 2, wherein the sensing of a change in temperature of a first zone is performed by a thermal imaging camera.

8. The method of claim 2, wherein the surface is selected from a group consisting of a roof, a sidewall, or ductwork of the metallurgical furnace.

9. A cooling system for regulating temperature of a surface of a metallurgical furnace, the cooling system comprising:

a spray cool supply header disposed in a wall or a roof of the metallurgical furnace, the spray cool supply header having a control header valve to control an amount of coolant flowing therethrough;

a plurality of spray conduits connected to and extending from the spray cool supply header, each spray conduit having one or more control conduit valves operable to control an amount of coolant flowing to a plurality of spray nozzles configured to spray coolant on the surface, at least one spray conduit of the plurality of spray conduits arranged around a first zone of a plurality of zones in the wall or roof of the metallurgical furnace;

a plurality of sensors disposed in the wall or roof and configured to detect the temperature of the surface of the wall or roof of the metallurgical furnace in each zone of the plurality of zones; and a control system coupled to the plurality of sensors, the control header valve, and the one or more control conduit valves, the control system configured to adjust the amount of coolant flowing through at least one spray conduit of the first zone relative to one or more of the spray conduits of a second zone.

10. The cooling system of claim 9, wherein the plurality of sensors are thermal imaging cameras.

11. The cooling system of claim 9, wherein the control system is configured to relatively provided an increased amount of coolant to the one or more of the spray conduits of the first zone relative to an amount of coolant to the one or more of the spray conduits of the second zone, the first zone having a high heat load and the second zone having a low heat load.

12. The cooling system of claim 9, wherein the one or more control conduit valves and the control header valve are electrically coupled to the control system.

13. The cooling system of claim 9, wherein the plurality of sensors measure the temperature of the surface.

14. The cooling system of claim 9, wherein the plurality of sensors measure a temperature of a run-off of the coolant after the coolant has been sprayed on the surface.

15. The cooling system of claim 9, wherein the surface is selected from a group consisting of a roof, a sidewall, or a ductwork of the metallurgical furnace.

16. The cooling system of claim 9, wherein adjusting the amount of coolant flowing through the one or more control conduit valves and the control header valve involves adjusting, turning on, turning off, increasing, and decreasing the amount of coolant flowing through the one or more control conduit valves and the control header valve.

17. The cooling system of claim 16, wherein the control system adjusts the amount of coolant flowing of the first-zone to a high flow of cooling fluid and the amount of coolant flowing of the second zone to a low flow of cooling fluid.

* * * * *